United States Patent [19]

Hayes et al.

[11] Patent Number: 6,077,886
[45] Date of Patent: Jun. 20, 2000

[54] CURABLE RESIN COMPOSITIONS

[75] Inventors: Barry James Hayes, Little Eversden; Kevin Brian Hatton, Bishop's Stortford, both of United Kingdom

[73] Assignee: Ciba Specialty Chemicals Corpation, Tarrytown, N.Y.

[21] Appl. No.: 08/947,997

[22] Filed: Oct. 9, 1997

[30] Foreign Application Priority Data

Oct. 11, 1996 [GB] United Kingdom .................... 9621196

[51] Int. Cl.⁷ ..................................................... C08L 63/02
[52] U.S. Cl. ................. 523/466; 106/287.22; 106/287.3; 523/443; 528/93; 528/94; 528/119; 528/120
[58] Field of Search .................................... 523/443, 466; 528/93, 94, 119, 120; 106/287.22, 287.3; 156/330

[56] References Cited

U.S. PATENT DOCUMENTS 3,939,020  2/1976  Caramanian et al. .................... 156/64
4,238,387  12/1980  Antonelli et al. .................... 260/42.29

FOREIGN PATENT DOCUMENTS 60-104173  8/1985  Japan .
06345942  12/1994  Japan .
6345942  12/1994  Japan .

OTHER PUBLICATIONS

Derwent Abst. 95–070448 (Dec. 1994).
Derwent Abst. 85–175023 (Jun. 1985).
Derwent Abst. 95–070509 (Dec. 1994).
Derwent Abst. 85–047063 (Jan. 1985).

*Primary Examiner*—Robert Dawson
*Assistant Examiner*—D. Aylward
*Attorney, Agent, or Firm*—David R. Crichton; Jacob M. Levine

[57] ABSTRACT

A curable epoxy resin composition comprising (A) an epoxy resin, (B) a thixotropic agent in an amount sufficient to induce thixotropic properties, and a hardener comprising (C) at least one polyethyleneimine and (D) at least one other amine having at least 2 amino hydrogen atoms, the combined amounts of (C) and (D) being sufficient to effect cure of the epoxy resin.

15 Claims, 1 Drawing Sheet

CURABLE RESIN COMPOSITIONS

This invention relates to curable epoxy resin compositions. In many applications there is a need for an epoxy resin composition which develops an almost instant increase in texture even up to the point of being totally non-slump on mixing of the resin and hardener components.

Such applications are widespread and include adhesives, sealants, mastics, stopping compounds, caulking materials, encapsulants and surface coatings amongst many others.

Dispensing of such epoxy resin components may be from bottles, cans, tubes, sachets and drums for instance and sometimes may be mixed with the hardener components via static or dynamic mixer heads.

There are some very demanding applications where epoxy/hardener compositions are required to exhibit no slump when mixed and laid horizontally oriented on a vertical surface in thickness up to 40 mm and greater.

These epoxy resin compositions can be very viscous, thixotropic or even of low viscosity, but are still required to develop non-slump properties quickly on mixing of their components. The degree of non-slumping required can even be that of retaining almost exactly the shape and dimensions achieved by extruding the compositions through a shaped orifice.

This rapid gain of non-slump texture is frequently obtained by dispersing a thixotropic agent such as a hydrophilic fumed silica in the resin, to give a viscous, thrixotropic or low viscosity flowing composition, and then mixing this composition with an amine hardener containing primary and/or secondary amino groups. The resulting blends, provided sufficient thixotropic agent is used, generally retain their shape and non-slump properties until they are gelled and cured. However, it has been found that many such blends, when subjected to mechanical stress before gelation, distort easily, lose structure and actually flow even after the stress is removed.

There are many applications for epoxy resin based adhesives, sealants and mastics etc. where the rate of application and volume consumed is high. In such cases it is common practice to pump or extrude the resins and hardeners from their containers through delivery pipes to mixer heads whereby the two components are thoroughly blended and discharged.

In some applications it is desirable that this discharged mixture (of resin and hardener) be applied (extruded onto) a suitable surface in a particular shape or pattern. For such applications it is highly desirable that the discharged mixture maintains this particular shape or pattern until gelled or processed further. In such methods the resin and hardeners can be exposed to a high shear stress regime. It is well known, however, that such stresses can result in a lowering of viscosity which can, in turn, lead to distortion of the shape or pattern. Such distortion is known as sag or slump. Where retention of extruded shape properties is required, such prior shearing during the discharging process could have detrimental effects on the shape retention properties of the extruded mixture. There are applications where epoxy/hardener compositions are required to exhibit no slump after such shearing and mixing grevations, even under conditions where the composition is laid horizontally mounted on a neutral surface in thicknesses of up to 40 mm and greater. It is also known that mixtures of epoxy resins and hydrophilic silicas "age" on storage. Such that on mixing with the hardner component the desired non slump and sag resistance properties, can be lost over time. This slump/ageing effect is described in Technical Bulletin Pigments, 4th Edition, 1989 (Degussa), No. 27 - Aerosil (RTM) for Solvent Free Epoxy Resins, at pages 8 and 11.

These factors: resin-hydrophilic silica ageing; loss of extruded shape as a result of pre-shearing stress; sensitivity to mechanical disturbance singly and combined, have provided significant technical challenges in the design and formulation of epoxy compositions of this type up till now. Thus, it would be desirable to develop a curable resin composition which could be discharged (as a mixture of resin and hardner) in a predetermined shape; is robust to pre-shearing stresses; can be combined with hydrophlic silica with improved non slump and sag resistance properties.

Figure 1:
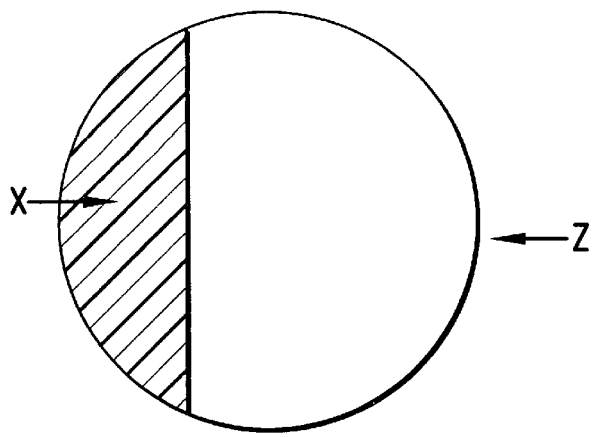
FIG. 1 is a sectional view of a moulded mixture applied to the upward facing side of a cylindrical container.
Figure 2:
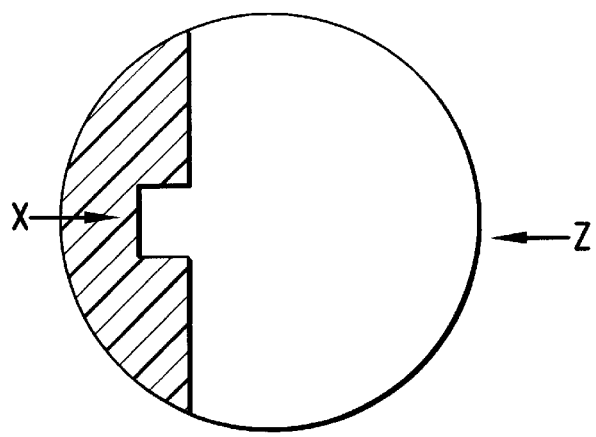
FIG. 2 is a sectional view of an imprinted moulded mixture applied to the upward facing side of a cylindrical container.
Figure 3:
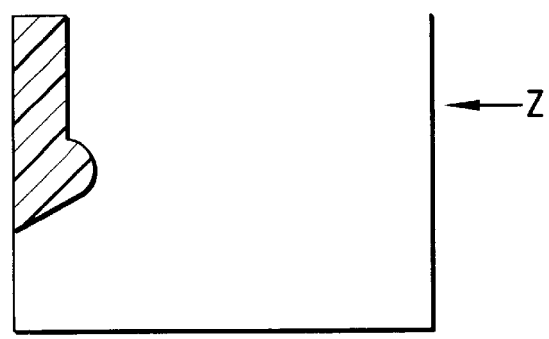
FIG. 3 is a plan view of an imprinted moulded mixture applied to the upward facing side of a cylindrical container.

It has now been found that epoxy resin compositions having excellent non-slump properties; improved slump resistance on subjection to mechanical stress; good slump resistance after prolonged post-mixing time; improved non-slump and sag resistance on first mixing and on ageing when combined with hydrophilic silica, can be produced by using as the hardener component a mixture of a polyethyleneimine together with another amine hardener having at least 2 amino hydrogen atoms.

Accordingly, the present invention provides, in one aspect, a curable epoxy resin composition comprising (A) an epoxy resin, (B) a thixotropic agent in an amount sufficient to induce thixotropic properties, and a hardener comprising (C) at least one polyethyleneimine and (D) at least one other amine having at least 2 amino hydrogen atoms, the combined amounts of (C) and (D) being sufficient to effect cure of the epoxy resin.

The epoxy resin (A) may consist of one or more epoxy resins which are themselves liquid or may be a liquid mixture of one or more solid epoxy resins with one or more liquid epoxy resins or may be one or more solid epoxy resins dissolved in a diluent such as a diluent conventionally used in epoxy resin compositions. The epoxy resin may be a polyglycidyl ether of a polyhydric alcohol such as 1,4-butanediol or 1,3-propanediol or, preferably, a polyglycidyl ether of a polyhydric phenol, for example a bisphenol such as bis(4-hydroxyphenyl)methane (bisphenol F) or 2,2-bis-(4-hydroxyphenyl)propane (bisphenol A) or a novolak formed from formaldehyde and a phenol such as phenol itself or a cresol, or a mixture of two or more such polyglycidyl ethers. Polyglycidyl ethers of bisphenol A are especially preferred. The epoxy resin, particularly where it comprises a solid epoxy resin, may contain one or more epoxy-functional diluents, usually monoepoxides, or non-epoxide diluents, such as the monoepoxide and non-epoxide diluents conventionally used in curable epoxy resin compositions.

The thixotropic agent (B) is preferably a thixotropic agent which, it is believed, relies largely on interparticle hydrogen bonding to achieve its thixotropic effect, especially a hydrophilic fumed silica. The amount of thixotropic agent required to induce thixotropic properties may depend on the nature of the specific epoxy resin and specific thixotropic agent used. This amount is generally from 1 to 20%, preferably from 3 to 15%, by weight based on the weight of the epoxy resin (A).

The polyethyleneimine (C) may have a molecular weight (Mw) from 700 to 1,000,000 or more, preferably from 5000 to 750,000, especially from 25,000 to 750,000, particularly about 750,000. Such polyethyleneimines are commercially available or may be prepared from ethyleneimine by known procedures.

The amount of polyethyleneimine is generally chosen so that the epoxy resin composition of the invention does not flow during a desired time after the formation of the composition. Preferably, the amount of polyethyleneimine is such that the epoxy resin composition does not flow for at least 60 minutes after formation thereof. In certain specific embodiments of the invention, the amount of polyethyleneimine is such that the epoxy resin composition does not flow prior to gelation thereof, which in some instances requires several hours. The amount of polyethyleneimine needed to impart non-flow properties for a given time can be readily determined by simple experiment. For compositions of the invention containing the especially preferred components (A), (B) and (D) described herein, an amount of polyethyleneimine from 0.2 to 2 parts by weight per 100 parts by weight of the epoxy resin is preferred.

As examples of amines suitable for use as the amine hardener (D) there may be mentioned those aliphatic, cycloaliphatic, aromatic, araliphatic and heterocyclic amines known as hardeners for epoxy resins, including: alkylene-diamines such as ethylenediamine or butane-1,4-diamine; polyalkylenepolyamines such as diethylenetriamine, triethylenetetramine, tetraethylenepentamine, dipropylen-etriamine or tripropylenetetramine; N-hydroxyalkyl derivatives of polyalkylene polyamines such as N-(hydroxyethyl) diethylenetriamine or mono-N-2-hydroxypropyl derivative of triethylenetetramine; polyoxyalkylenepolyamines such as polyoxyethylene - and polyoxypropylene - diamines and triamines; N,N-dialkylalkylenediamines such as N,N-dimethylpropane-1,3-diamine or N,N-diethylpropane-1,3-diamne; cycloaliphatic amines having an amino or aminoalkyl group attached to the ring, such as 3-aminomethyl-3,5,5-trimethylcyclohexylamine (isophoronediamine); aromatic amines such as bis(4-aminophenyl)methane or bis(4-aminophenyl)sulphone; amine-terminated adducts of epoxy resins with aliphatic, cycloaliphatic or araliphatic amines as hereinbefore described; N-aminoalkyl-piperazines such as N-(2-aminoethyl)piperazine or N-(3-aminopropyl)piperazine; and polyaminoamides, for example reaction products of polyalkylenepolyamines such as those hereinbefore mentioned with polymerised unsaturated fatty acids, e.g. polymerised vegetable oil acids such as dimerised or trimerised linoleic or ricinoleic acids; or a mixture of two or more of such amines.

Aliphatic and cycloaliphatic amine hardeners are usually preferred for use as component (D) of the composition, including N-hydroxyalkyl derivatives of polyalkylene polyamines, particularly a mono-N-2-hydroxypropyl derivative of triethylenetetramine, and mixtures thereof with polyaminoamide reaction products of polyalkylenepolyamines and polymerised vegetable oil acids and the amine functional reaction products of amines and epoxy group containing compounds. The amount of (D) is preferably such that (C) and (D) together provide from about 0.75 to 1.25 amino hydrogen equivalents per 1,2-epoxide equivalent of the epoxy resin (A).

The epoxy resin resin composition of the invention may also contain minor amounts of accelerators and additives conventionally used in curable epoxy resin compositions, such as diluents, fillers, fibres, pigments, dyes, fire retardants, antifoaming agents, wetting agents and polymeric toughening agents.

The epoxy resin composition may be formed conveniently by stirring a preformed mixture of (A) and (B) together with a preformed mixture of (C) and (D). Hence the composition may conveniently be supplied in the form of a two-part pack. Accordingly, the present invention also provides a two-part pack comprising a first part containing (A) a liquid epoxy resin as hereinbefore described and (B) a thixotropic agent as hereinbefore described and a second part containing (C) a polyethyleneimine as hereinbefore described and (D) at least one other amine having at least 2 amino hydrogen atoms as hereinbefore described. If desired, the second part may also contain a thixotropic agent (B). The optional components such as diluents may be in either the first or second part, or in both.

Cure of the epoxy resin composition of the invention can be effected in accordance with conventional practice in the particular application. In general, the composition can be allowed to gel (set) at ambient temperature or heated moderately in accordance with conventional practice to accelerate setting. Subsequently, completion of cure may be effected at ambient temperature, moderately elevated temperature or higher temperature as required.

The epoxy resin composition of the invention can be used in any of the abovementioned applications. It may be used in applications where it is desired to produce a randomly shaped composition which is to be shaped to a particular form before or after gelation or cure. It is particularly useful as an adhesive, especially where the adhesive has to be applied to a surface, such as that of a decorative building panel, which has to be held in an upright, e.g. vertical, position. Accordingly, the present invention also provides a method of bonding two surfaces together using an adhesive, characterised in that the adhesive is an epoxy resin composition of the invention as hereinbefore described.

The invention is illustrated by the following non-limiting Examples, in which all parts are on a by weight basis.

EXAMPLE 1

A liquid polyglycidyl ether of bisphenol A having an epoxide content of 5.3 mol/kg (100 parts) was mixed with a hydrophilic fumed silica available from Degussa as A380 (8 parts) in a planetary mixer for 10 minutes. To the resulting mixture was added a mixture of 20 parts of a hardener consisting of X parts of a polyethyleneimine having a molecular weight (Mw) of 25,000 available from BASF as Lupasol W, 20-X parts of a mono N-2-hydroxypropyl derivative of triethylenetetramine and (RTM), benzyl alcohol (8.0 parts). The resulting composition was divided into portions which were tested for slump (after applied mechanical stress) at various time intervals. As a control, the experiment was repeated using a composition which was identical, with the exception, that it contained 20 parts of hydroxypropylated triethylenetetraime hardener rather than the polyethyleneimine. The slump resistance results obtained were as follows:

| X (parts) | Time after initial mixing | Result |
|---|---|---|
| 0 (control) | 30 minutes | slump and flow |
| 0.2 | 60 minutes | no slump |
| 0.65 | 75 minutes | no slump |
| 1.1 | 75 minutes | no slump |
| 2.0 | 75 minutes | no slump |

EXAMPLE 2

The composition according to Example 1 was prepared using a polyethyleneimine having a molecular weight (Mw) of 750,000 available from BASF as Lupasol P (RTM). The resulting composition was divided into portions which were tested for slump (after applied mechanical stress) at various time intervals. As a control, the experiment was repeated using a composition which was identical, with the exception that, it contains 20 parts of hydroxypropylated triethylenetetraime hardener rather than the polyethyleneimine. The slump resistance results obtained were as follows:

| X (parts) | Time after initial mixing | Result |
|---|---|---|
| 0 (control) | 30 minutes | slump and flow |
| 0.2 | 60 minutes | no slump |
| 0.65 | 75 minutes | no slump |
| 1.1 | 75 minutes | no slump |
| 2.0 | 75 minutes | no slump |

EXAMPLE 3

A mastic composition (Composition 3A) was prepared by mixing together a liquid polyglycidyl ether of bisphenol A having an epoxide content of 5.3 mol/kg (100 parts), hydrophilic fumed silica A380 (9.2 parts), fly ash filler (85.0 parts), a mono N-2-hydroxypropyl derivative of triethylenetetramine (12.3 parts), a polyaminoamide reaction product of a polyalkylenepolyamine and polymerised vegetable oil acid available as Versamid 140 (RTM) (16.4 parts), Lupasol WF (RTM) polyethyleneimine (1.5 parts), hydrocarbon diluent (14.0 parts), benzyl alcohol (6.0 parts) and glycerol (0.4 parts). The mastic composition was loaded into cartridges and extruded, after various time intervals, as beads 1 cm high onto horizontal panels. The panels were then placed in a vertical position and the beads examined for slump behaviour.

For comparative purposes, the experiment was repeated using a mastic composition (Composition 3B) which was the same as Composition 3A, with the exception that, it contained 13.8 parts of hydroxypropylated triethylenetetramine as hardener rather than polyethyleneimine. The slump resistance results obtained were as follows:

| | Result | |
|---|---|---|
| Time after initial mixing | Composition 3A | Composition 3B |
| 30 minutes | no slump | no slump |
| 45 minutes | no slump | slump (0.5 cm) |
| 60 minutes | no slump | severe flow (7.5 cm) |
| 75 minutes | no slump | severe flow (8.0 cm) |
| 90 minutes | no slump | slump (4.0 cm) |
| 105 minutes | no slump | slump (2.0 cm) |
| 120 minutes | no slump | slump (1.5 cm) |
| 210 minutes | no slump | slump (0.5 cm) |

After 75 minutes, composition 3B (without the polyethyleneimine hardener) exhibited slump behaviour. It is believed that this slump may result from the reaction between the hydroxypropylated trethylenetetramine hardener with the resin. The composition accordingly to the present invention, Composition 3A does not exhibit slump, even after 210 minutes from initial mixing (and discharge and extrusion).

EXAMPLE 4

This example illustrates the effect of storage and preshearing on the performance of resin compositions with and without the polyethyleneimine hardeners according to the present invention.

A resin composition (composition 4A) was prepared by mixing together a liquid polyglycidyl ether of bisphenol A having an epoxide content of 5.3 mol/kg (100 parts), hydrophilic fumed silica A 380 (8.0 parts) and benzyl alcohol (6.0 parts). The blend was a pourable viscous liquid. Resin Composition 4A was split into batches and stored under the following storage regimes:

4A(i) 7 days at 23° C. - i.e. fresh

4A(ii) 300 days at 23° C. - medium age

4A(iii) 7 days at 100° C. - accelerated ageing believed to be the equivalent of at least two years at 23° C.

Three hardener compositions 4B, 4C and 4D were prepared. These hardeners were:

Composition 4B - a mono N-2-hydroxypropyl derivative of triethylene tetramine

Composition 4C - Composition 4B (10.0 parts) mixed with a 50% solution of polyethyleneimine in benzyl alcohol (0.8 parts) 28,000 m.wt.

Composition 4D - Composition 4B (10.0 parts) mixed with a 50% solution of polyethyleneimine 750,000 m.wt. in benzyl alcohol Test compositions were prepared by mixing a portion of each of the test resins 4A(i), 4A(ii) and 4A(iii) with each of the test hardener compositions 4B, 4C and 4D. For the avoidance of doubt, the hardener compositions (4B, 4C and 4D) were mixed in their 'fresh' condition, which was after 7 days storage at 23° C.

In order to obtain quantitive measurements on the effects of preshearing on the mixtures of Compositions 4A (i), (ii) and (iii) with Compositions 4B, 4C and 4D each mixture was tested on a TA instruments CSL$^2$ 500 Carn-Med Rheometer using a 2 cm diameter, 2 degree angle cone using the flow procedure with a stepped ramp, with and without a marker at 100 sec$^{-1}$, for one minute. The yield point for each (expressed as Yield Stress, Y, and measured in pascals, in Pa) of these mixtures was then determined from a plot of viscosity against shear stress.

Such yield point (Y) measurements indicate the individual cohesive strengths of each of the mixed compositions and the relative likelihood of each mixed composition to exhibit non-sag/non slump and shape retention properties, both when first discharged onto a surface and over time.

The results of these measurements are given in following Table I:

TABLE I

| | RESIN AGEING CONDITION | | | | | |
|---|---|---|---|---|---|---|
| PARTS PER 100 PARTS | 4A(i) no preshear: preshear | | 4A(ii) no preshear: preshear | | 4A(iii) no preshear: preshear | |
| 4A(i) or (ii) or (iii) | Y(Pa) | Y(Pa) | Y(Pa) | Y(Pa) | Y(Pa) | Y(Pa) |
| Composition 4B 19.0 | 800 | 650 | 520 | 500 | 0 | 0 |
| Composition 4C 20.7 | 800 | 500 | 800 | 800 | 900 | 0 |
| Composition 4D 20.7 | 1500 | 800 | 1700 | 1200 | 1800 | 1800 |

These measurements indicate that in the absence of any polyethyleneimine hardener the yield stress (Y) of the mixture of composition 4B and 4A (i) (i.e. fresh resin), is comparable with the yield stress (Y) of the mixture of hardener containing polyethyleneimine of 25,000 mol. wt. composition 4C and 4A (i). The yield stress (Y) of the mixed system without polyethyleneimine hardener (mixtures 4B/4A(i), 4B/4A(ii); 4B/4A(iii)) decreases in proportion to the storage regime of the pretreated resin 4A. Composition 4B/4A(ii) has a lower yield stress (Y) than composition 4B/4A(i) and composition 4B/4A(iii) has an even lower yield strength of 0 i.e. it is a free flowing liquid.

In comparison, the mixtures with the 25,000 mol. wt. polyethyleneimine hardener display superior performance when combined with 4A(ii) and 4A(iii) in the absence of pre-shearing. Furthermore, as already discussed, the performance of Composition 4B when mixed with 4A(i), (ii) or (iii), is unsatisfactory because its initial slump resistance is lost on mechanical agitation after mixing but before gelation. The compositions according to the present invention, Compositions 4C/4A(i); 4C/4A (ii); 4C/4A (iii) and 4D/4A (i); 4D/4A(ii); 4D(iii) display improved yield stress properties over the nil polyethyleneimine systems.

In addition, the results in Table I illustrate the improved yield strengths obtained with the hardener containing polyethyleneimine of 750,000 mol. wt. (compositions with 4D) under all the conditions of storage and shearing versus both the systems containing polyethyleneimine hardener having a 25,000 mol wt and the non-polyethyleneimine hardener systems. It is believed that this data indicates that in applications wherein large extensions or profiles of resin/hardener composition are required to be non-sagging and exhibit improved extrusion shape retention, across a range of resin age and or storage conditions, then, polyethylene imine hardeners having molecular weight of between about 25,000 to about 750,000, particularly greater than about 25,000 to about 750,000 and especially about 750,000 have the highest potential to deliver good non-sag/slump resistance performance. These results further indicate that the non sag performance advantages of higher mol wt. polyethyleneimines become more apparent where the mixture is subjected to high shearing forces as encountered in static and dynamic mixers and similar.

EXAMPLE 5

This example further illustrates the effectiveness of the higher molecular weight polyethyleneimine in giving texture, flow and sag resistance to epoxy hydrophilic silica blends. In this instance, in order to differentiate between them, the two test polyethyleneimines were utilised alone, that is without a cohardener. For comparison a standard hardener was also utilised at the same addition levels.

A resin composition 5A was prepared by mixing together a liquid polyglycidyl ether of bisphenol A having an epoxide content of 5.3 mol/kg (100 parts), hydrophilic fumed silica, A380 (4.0 parts) and benzyl alcohol (8.0 parts). The blend was a free flowing liquid.

100 gram positions of Composition 5A were stored at 23° C. in open topped cylinder containers. Into those were added:

Composition 5B - a mono N-2-hydroxyl derivative of triethylene tetramine - having molecular weights of about 750,000 are likely to deliver the most satisfactory performance 0.18 grams Composition 5C - a polyethyleneimine of 25,000 molecular weight - 0.18 grams Composition 5D - a 50% solution of polyethyleneimine 750,000 in benzyl alcohol - 0.36 grams Each of these weighed quantities was thoroughly hand mixed for 30 seconds. The results were:

Composition 5A plus 5B - soft, non flowing texture, no slump off stirring spatula Composition 5A plus 5C - soft, flows and slumps off stirring spatula Composition 5A plus 5D - soft, non flowing texture, no slump off stirring spatula After 30 minutes each of these mixtures were restirred for 30 seconds with the following results:

Composition 5A plus 5B - flowed very readily

Composition 5A plus 5C - flowed slowly and slumped off stirring spatula

Composition 5A plus 5D - soft texture with no flow or slump off the stirring spatula These results illustrate the improved slump performance of polyethyleneimine hardeners with hydrophilic fumed silica containing epoxy resins versus that demonstrated by low molecular weight amines hardeners alone. The results also show that the 750,000 molecular weight polyethyleneimine has improved performance versus the 25,000 molecular weight polyethyleneimine in combination with hydrophilic silica.

EXAMPLE 6

This example illustrates the differences in slump and/or flow properties of various resin/hardener mixtures both on the point of first mixing, and when under a regime where the mixture is mixed, then allowed to stand for a fixed period of time (15 minutes), then mixed again. This standing, mixing, assessing process was repeated for three mixtures of resin and hardener.

In addition, as the resin mixtures of Example 6 were subjected to differing storage regime (23° C. and 100° C.) for differing periods of time (0 days, 1 day, 2 days, 4 days, 8 days, 16 days), it has been possible to prepare resin/hardener mixtures comprising 'fresh' resin (i.e. resin available on initial mixing /0 days old) with 'fresh' hardener as well as resin/hardener mixtures comprising 'aged' resin with 'fresh' hardener. By visual assessment of the slump or flow properties demonstrated by these various test mixtures it is possible to compare the shape retention potential (non slump performance) of samples wherein the resin portion has been 'aged' under two storage regime (23° C. and 100° C.).

| RESIN MIXTURE A: | Parts by weight |
|---|---|
| Bis A liquid epoxy resin (5.3 epoxy equivalents per mole) | 100.0 |
| Benzyl alcohol | 8.0 |
| Hydrophilic fumed silica Aerosil A 380 (RTM) | 8.0 |

The resin (mixture A) was split into batches which were stored in closed containers at 100° C. and 23° C. for periods of up to 2, 4, 8 and 16 days. For the avoidance of doubt 1 day herein equals to about 24 hours.

| HARDENERS: | | Parts by weight |
|---|---|---|
| 1) | monohydroxy propylated triethylene tetramine | 22.0 |
| 2) | monohydroxy propylated triethylene tetramine | 20.4 |
| | polyethylene imine 25,000 mol. wt. | 1.6 |
| 3) | monohydroxy propylated triethylene tetramine | 20.4 |
| | polyethylene imine 750,000 mol. wt. | 1.6 |
| | benzyl alcohol | 1.6 |

At various time intervals samples of the resin mixture A were mixed with each hardener (1, 2 or 3) individually at 23° C., and then each resin/hardener mixture was visually assessed for slump properties, both after initial mixing, and after physical disturbance every 15 minutes up to the point where gelation was first noted. The presence of slump or flow properties were observed and recorded visually.

Slump and flow were determined qualitatively after mixing by moulding the resin/hardener mixture into a predetermined shape (X) on the side of a container (Z). Each resin/hardener mixture was then assessed for initial moulding (0 days/first mixing) slump or flow potential.

To simulate the 'real-life' compression experiences of resin/hardener beads which are compressed onto solid surfaces, the test resin/hardener mixtures of Example 6 were subjected to mechanical disturbance by the mechanical compression (by hand) of a spatula onto the premoulded resin/hardener mixture of shape (X) to create a spatula shaped imprint (or stamp). This imprinted (mechanically disturbed) resin/hardener mixture was then re-moulded to shape X, provided it had not already slumped or flowed. This process was repeated up to 4 times and subsequent visual assessments of slump or flow on these stamped and remoulded mixtures were then made after every 15 minutes (from first mixing) up to 1 hour (60 minutes).

Drawings I, II and III of this application illustrate: moulded mixture of shape X in container Z; a section of an imprinted moulded resin/hardener mixture in container Z and a plan of the imprinted moulded resin in container Z.

The quantity of resin/hardener mixture used for each of these tests was 10 gramms and the diameter of the top of the clear plastic container (Z) was 4 cm.

| MIX RATIOS USED WERE: | | | |
|---|---|---|---|
| | I | II | III |
| Resin A | 100.0 parts by weight (p.b.w.) | 100.0 p.b.w | 100 p.b.w |
| Hardener 1 | 18.6 p.b.w. | — | — |
| Hardener 2 | — | 19.0 p.b.w | — |
| Hardener 3 | — | — | 20.3 p.b.w |

The results of these storage tests are illustrated in Tables II, III and IV.

TABLE II

| | MIXTURE I | | | | | |
|---|---|---|---|---|---|---|
| Resin A + | Storage Time (days) | | | | | |
| Hardener 1 | 0 | 1 | 2 | 4 | 8 | 16 |
| (i) Storage Temp 23° C. | | | | | | |
| slump after mixing | — | — | — | — | — | — |
| slump after mixing + mechanical disturbance of | | | | | | |
| (a) 15 minutes | — | — | — | — | — | — |
| (b) 30 minutes | slump | slump | slump | slump | slump | slump |
| (c) 45 minutes | flow | flow | flow | flow | flow | flow |
| (d) 60 minutes | gelled | gelled | gelled | gelled | gelled | gelled |
| (ii) Storage Temp 100° C. | | | | | | |
| slump after mixing | — | slump | slump | slump | slump | slump |
| slump after mixing + mechanical disturbance of | | | | | | |
| (a) 15 minutes | — | flow | flow | flow | flow | flow |
| (b) 30 minutes | flow | flow | flow | flow | flow | flow |
| (c) 45 minutes | flow | flow | flow | flow | flow | flow |
| (d) 60 minutes | gelled | gelled | gelled | gelled | gelled | gelled |

TABLE III

| | MIXTURE II | | | | | |
|---|---|---|---|---|---|---|
| Resin A + | Storage Time (days) | | | | | |
| Hardener 2 | 0 | 1 | 2 | 4 | 8 | 16 |
| (i) Storage Temp 23° C. | | | | | | |
| slump after mixing | — | — | — | — | — | — |
| slump after mixing + mechanical disturbance of | | | | | | |
| (a) 15 minutes | — | — | — | — | — | — |
| (b) 30 minutes | — | — | — | — | — | — |
| (c) 45 minutes | — | — | — | — | — | — |
| (d) 60 minutes | gelled | gelled | gelled | gelled | gelled | gelled |
| (ii) Storage Temp 100° C. | | | | | | |
| slump after mixing | — | slight slump | slump | slump | slump | slump |
| slump after mixing + mechanical disturbance of | | | | | | |
| (a) 15 minutes | — | slight slump | slump | slump | slump | slump |
| (b) 30 minutes | — | slight slump | slump | slump | slump | slump |
| (c) 45 minutes | — | slight slump | slump | slump | slump | slump |
| (d) 60 minutes | gelled | gelled | gelled | gelled | gelled | gelled |

TABLE IV

| Resin A + | MIXTURE III | | | | | |
|---|---|---|---|---|---|---|
| | Storage Time (days) | | | | | |
| Hardener 3 | 0 | 1 | 2 | 4 | 8 | 16 |
| (i) Storage Temp 23° C. | | | | | | |
| slump after mixing | — | — | — | — | — | — |
| slump after mixing + mechanical disturbance of | | | | | | |
| (a) 15 minutes | — | — | — | — | — | — |
| (b) 30 minutes | — | — | — | — | — | — |
| (c) 45 minutes | — | — | — | — | — | — |
| (d) 60 minutes | — | — | — | — | — | — |
| (ii) Storage-Temp 100° C. | | | | | | |
| slump after mixing | — | — | — | — | — | — |
| slump after mixing + mechanical disturbance of | | | | | | |
| (a) 15 minutes | — | — | — | — | — | — |
| (b) 30 minutes | — | — | — | — | — | — |
| (c) 45 minutes | — | — | — | — | — | — |
| (d) 60 minutes | — | — | — | — | — | — |

The results obtained herein illustrate the advantages of the polyethyleneimine hardeners of the present invention for the delivery of improved slump resistance after mixing and before gelation, versus standard polyethylenepolyamine type epoxy hardners.

Table III illustrates that inclusion of a polyethyleneimine hardner having a molecular weight of about 25,000 (Hardner 2) provides excellent non-slump performance under normal storage conditions (23° C.) and improved slump resistance over about 1 or 2 days under elevated storage temperature conditions (100° C.) versus polyethylenepolyamine type epoxy hardners.

Table IV illustrates that the inclusion of a polyethyleneimine hardner having a molecular weight of about 750,000 (Hardner 3) provides excellent non-slump performance advantages versus polyethylenepolyamine type epoxy and the 25,000 molecular weight polyethyleneimine hardners across conditions of temperature and storage.

We claim:

1. A curable epoxy resin composition comprising (A) an epoxy resin, (B) a thixotropic agent in an amount sufficient to induce thixotropic properties, and a hardener comprising (C) at least one polyethyleneimine and (D) at least one other amine having at least 2 amino hydrogen atoms, the combined amounts of (C) and (D) being sufficient to effect cure of the epoxy resin.

2. A composition according to claim 1, in which (A) is a polyglycidyl ether of a polyhydric alcohol or polyhydric phenol.

3. A composition according to claim 1, in which (B) is a hydrophilic fumed silica.

4. A composition according to claim 1, in which (B) is present in an amount of 1 to 20% by weight, based on the weight of the epoxy resin (A).

5. A composition according to claim 4, in which said amount is 3 to 15% by weight.

6. A composition according to claim 1, in which the polyethyleneimine (C) has a molecular weight of 700 to 1,000,000.

7. A composition according to claim 6, in which (C) has a molecular weight of 25,000 to 750,000.

8. A composition according to claim 7, in which (C) has a molecular weight of about 750,000.

9. A composition according to claim 1, in which the amount of (C) is sufficient to prevent flow of the composition when applied to a vertical surface for at least 60 minutes after formation thereof.

10. A composition according to claim 1, in which the amount of (C) is sufficient to prevent flow of the composition when applied to a vertical surface prior to the gelation thereof.

11. A composition according to claim 1, in which the amount of (C) is 0.2 to 2 parts by weight per 100 parts by weight of the epoxy resin.

12. A composition according to claim 1, in which (D) is an aliphatic amine.

13. A composition according to claim 12, in which (D) is a N-hydroxyalkyl derivative of a polyalkylenepolyamine or a mixture thereof with a polyaminoamide reaction product of a polyalkylenepolyamine and a polymerised vegetable oil acid.

14. A two-part pack comprising a first part comprising (A) an epoxy resin as specified in claim 1 and (B) a thixotropic agent as specified in claim 1 and a second part comprising (C) at least one polyethyleneimine as specified in claim 1 and (D) at least one other amine hardener as specified in claim 1.

15. A method of bonding two surfaces together using an adhesive, comprising the steps of applying an adhesive to at least one of said surfaces and contacted said two surfaces with each other, characterized in that the adhesive is an epoxy resin composition according to claim 1.

* * * * *